Patented Jan. 14, 1936

2,027,462

UNITED STATES PATENT OFFICE 2,027,462

STABILIZING GUM FORMING PETROLEUM PRODUCT

Eugene Ayres, Swarthmore, and Mark L. Hill, Yeadon, Pa., assignors to Gulf Refining Company, Pittsburgh, Pa., a corporation of Texas No Drawing. Application December 13, 1932, Serial No. 647,070

7 Claims. (Cl. 44—9)

This invention relates to stabilizing gum forming petroleum products; and it comprises an improved petroleum product, such as a cracked motor fuel, lubricating oil or the like, carrying a small percentage of a particular organic compound, which is capable of being produced by the condensation of two organic bodies of particular nature at least one of which is a derivative of naphthalene, one of said organic bodies having one oxygen containing substituent, such as a keto, aldehyde or hydroxyl group, the other of said bodies containing one amine nitrogen atom, and both of said bodies being free from all other non-hydrocarbon substituents; and it also comprises a process of stabilizing gum-forming motor fuels wherein such a fuel in a fresh or newly made condition is treated by dissolving therein a minimal amount of an organic compound having the property of increasing the induction period of gum formation and also serving to reduce the rate at which gum is formed subsequent to said induction period, the said organic compound being one capable of production by the aforesaid condensation reactions between two organic bodies; all as more fully hereinafter set forth and as claimed.

In a prior and copending application by one of us (Ayres, Serial No. 561,813, filed Sept. 8, 1931) it has been shown that certain organic substances have the power of inhibiting the formation of gum in a motor fuel during the so-called "induction period" of gum formation and that certain other substances have the power of retarding the rate of gum formation subsequent to the said induction period. It was also shown that, when both inhibiting agents and retarding agents are present in a motor fuel, there usually results a greater degree of stability than can be obtained by the use of either of the two agents alone, or that a smaller total quantity of the two agents in combination is required in a motor fuel to produce a given stability specification. In this acknowledged copending application the use of inhibiting agents and retarding agents in combination in a motor fuel is described and claimed.

In the acknowledged application certain tests are described for determining the efficacy of any given material for use as an inhibiting or as a retarding agent. These tests may be described as follows: The well-known "oxygen stability test" can be used to measure the effect of a given substance upon the induction period of a motor fuel. According to this test a sample of the motor fuel is placed in a bomb in an atmosphere of pure oxygen under a pressure of 100 pounds per square inch. The bomb is heated by immersing it in boiling water. The rise of temperature causes a rise of pressure to some maximum point dependent upon the volatility of the material being tested. The bomb is kept in boiling water for 4 hours, during which time the pressure is recorded at regular intervals, say every 15 minutes. The number of minutes after the heating is started and until the pressure drops, to say 5 pounds below the maximum pressure, can be used as a measure of the induction period or "oxygen stability period", as it is sometimes called. Substances which, when added to the motor fuel, are found to increase this induction period are called "gum inhibitors" or "gum inhibiting agents". After 4 hours of heating, the bomb is cooled, the sample is removed and evaporated in a non-metallic dish for the determination of gum.

When the induction period of a motor fuel equals or exceeds the 4 hours of the test (that is, when the pressure in the bomb does not fall more than 5 pounds during the test) an exceedingly small amount of gum is formed, whereas with short induction periods, the gum formed is relatively enormous in quantity. In other words, this test shows that the formation of gum is delayed or inhibited during a certain period, beyond which the gum is formed at an enormously increased rate. It is obvious that it is highly important to prolong this initial period.

With certain changes, the oxygen stability test can also be used to measure another property of such fuels, namely the rate of gum formation after the expiration of the induction period. This rate of gum formation can be measured by a simple method which is useful in determining the effect of added ingredients upon this property.

A sample of gasoline to be tested is advantageously obtained before it has been treated with acid. This sample is divided into several parts which parts are then treated with the same quantity of acid but of various strengths, or with different quantities of acid of the same strength. The object of this is to produce a series of gasolines refined to different degress, most of which will show an induction period of considerably less than 4 hours. Oxygen stability tests are run on these samples, the amount of gum formed during the 4 hours of the test being determined at the end.

Since gum is formed in quantity only after the lapse of the induction period the time from the end of this period to the end of the test may be taken as the time during which gum is formed or as the "time of gum formation". The total gum formed during the test is found by analysis. This quantity is then divided by the time of gum formation, which gives values for the rate of gum formation. This rate is determined for each of the various samples mentioned above. The sample having the least treatment with acid naturally has the shortest induction period and hence the longest time of gum formation. The rate of gum formation, however, has been found to decrease somewhat with increase in the time of gum formation.

The results obtained as described above for the various samples of gasoline may be plotted. It is convenient to plot the rates of gum formation as ordinates against the times of gum formation as abscissas. A smooth curve is obtained which can then be used as a standard or blank with which to compare similar curves for gasolines of different origin or treatment.

In order to test the effect of various addition agents on the rate of gum formation, a certain amount of one of these agents is added to each of the gasoline samples. The samples are then again subjected to the same tests. The results obtained are compared with the values given by the blank samples. Comparison is best made by comparing the curves obtained after the results are plotted. The agents which have been found to reduce the rate of gum formation are called "gum retarding agents".

It is obvious, of course, that the above tests can be modified to a considerable extent, still giving results which can be used as a measure of the efficacy of certain agents in increasing the induction period and in reducing the rate of gum formation. In certain cases treatment with ultraviolet light or exposure to sunlight may replace treatment with oxygen under pressure. Comparable factors may be developed for such modifications of the methods. Another rather obvious modification for determining relative rates of gum formation subsequent to the reduction period is the extension of the stability test beyond the usual 4 hour limit. In this case, tests upon the rate of gum formation can be made upon highly refined gasolines which normally have an induction period longer than 4 hours. Another possible modification is to stop the test and to determine the amount of gum formed at a certain time interval after the end of the induction period as determined during the same test. However, the method outlined above gives satisfactory results for all purposes and is sufficiently accurate. It requires less time than most of the modifications which may be suggested.

In the course of an extended series of experiments we have discovered certain organic compounds which act simultaneously as inhibiting and as retarding agents or as "inhibitor-retarders" as they may be called. Upon comparing the structures and chemical constituents of these inhibitor-retarders we have been able to discern certain common characteristics of structure and chemical constitution among these compounds. We have been able to formulate certain general rules for the preparation of these inhibitor-retarders by chemical condensation reactions.

The best inhibitor-retarders of our invention are tertiary amines, at least one of the radicals (i. e. nuclei attached to the amine nitrogen atom) being a naphthalene residue. At least one of the radicals is an aromatic residue carrying at least one hydrocarbon substituent group selected from a class consisting of aliphatic and alkyl groups; the compounds as a whole being free from non-hydrocarbon substituents.

We have found that a product possessing the peculiar properties of inhibitor-retarders can be prepared by the condensation of two organic bodies, one being a cresol and the other di-alpha naphthylamine.

For purposes of condensing the above compounds, standard methods are applicable. The following methods have generally proved satisfactory:

1. The substances are merely heated together, usually at the maximum temperature permitted by boiling points and tendencies to decompose.
2. The substances are heated together in the presence of a trace of iodine as a catalyst.
3. The substances are heated together in the presence of hydrogen chloride as a catalyst.
4. The condensation may be catalyzed by a dilute solution of sodium hydroxide.

One typical condensation reaction which may be employed in the production of the inhibitor-retarders of the present invention is illustrated in the following specific example.

Di-alpha naphthylamine was prepared by the condensation of alpha naphthol with alpha naphthylamine. This product was then heated with cresol at 210° F. for several hours while maintaining an atmosphere of dry hydrogen chloride above the reaction mixture. The crude product thus obtained, when used in the proportion of 0.001 per cent by weight, was found to raise the induction period of a poorly refined cracked gasoline from 45 to more than 240 minutes, and to reduce the gum formed during the test from 1420 to 16 mg. The condensation product of this example was found to reduce the rate of gum formation subsequent to the induction period to about half the value obtained when alpha naphthol was used as the inhibiting agent.

The pure condensation product of di-alpha naphthylamine and ortho cresol has the probable formula,

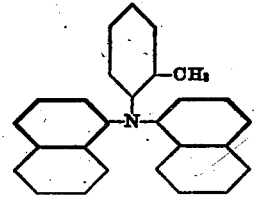

representing di-alpha naphthyl-2 methyl phenyl-amine.

While we have found the pure product to be an advantageous inhibitor-retarder, we have found the crude reaction product to have even better inhibiting qualities. Use of the crude reaction product is more economical. All of the cresols give excellent results.

The inhibitor-retarders of our invention can be added to various unstable, gum-forming petroleum products, such as cracked gasolines, kerosenes, lubricating oils and similar products. They can be added at various points in the processing of these products depending upon the nature of the inhibitor-retarder selected. It is usually best to add the agents to the finished products, most of them being sufficiently soluble so that dissolving them presents but little difficulty. The best concentration of a given agent to employ depends upon the agent itself as well as upon the particular petroleum product to which it is added. In some cases concentrations as low as 0.0005 per cent by weight are sufficient while in other cases the advantageous quantity to use may amount to 0.01 per cent or more. Generally the quantity added need not exceed a few thousandths of one per cent. By means of the tests set out previously it is a simple matter to ascertain the most advantageous agent to employ and the best concentration for the purpose in question.

What we claim is:—

1. A cracked gasoline containing a small proportion of a crude condensation product formed by reaction of di-alpha naphthylamine with cresol.

2. A cracked gasoline containing a small proportion of a di-alpha naphthyl-methyl phenylamine.

3. A cracked gasoline containing a small proportion of di-alpha naphthyl-2 methyl phenylamine.

4. A cracked gasoline containing between .0005 and .01 per cent by weight di-alpha naphthyl-2 methyl phenylamine.

5. A cracked gasoline containing approximately .001 per cent by weight of a crude condensation product formed by reaction between di-alpha naphthylamine and cresol.

6. In the stabilization of gum-forming gasolines, the process which comprises adding to such a gasoline a small proportion of a stabilizing agent having the properties of both an inhibitor and a retarder and being represented by the following probable formula

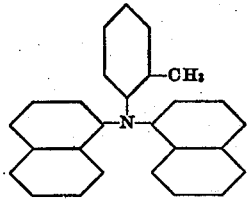

7. In the stabilization of gum forming cracked gasolines the process which comprises adding to such a gasoline between .0005 and .01 per cent by weight of a crude condensation product formed by reaction between di-alpha naphthylamine and cresol.

EUGENE AYRES.
MARK L. HILL.